(12) United States Patent
Sakai

(10) Patent No.: US 6,222,301 B1
(45) Date of Patent: Apr. 24, 2001

(54) MOTOR CONTROL APPARATUS AND IMAGE FORMING APPARATUS

(75) Inventor: Akihiko Sakai, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/192,194

(22) Filed: Nov. 16, 1998

(30) Foreign Application Priority Data

Nov. 17, 1997 (JP) .................................................... 9-315123

(51) Int. Cl.[7] .................................................... H02N 2/00
(52) U.S. Cl. .................................................... 310/316.01
(58) Field of Search .......................... 310/316.01, 316.02

(56) References Cited

U.S. PATENT DOCUMENTS

| | | | |
|---|---|---|---|
| 3,802,306 | * | 4/1974 | Brown et al. ............................. 83/12 |
| 4,777,504 | * | 10/1988 | Akada et al. ......................... 354/400 |
| 4,909,149 | * | 3/1990 | Melcher ................................ 101/232 |
| 4,914,336 | * | 4/1990 | Yamasaki ........................ 310/316.02 |
| 4,952,834 | * | 8/1990 | Okada ............................... 310/316.02 |
| 5,042,460 | * | 8/1991 | Sakurai et al. .................... 128/24 AA |
| 5,304,907 | * | 4/1994 | Abe et al. .............................. 318/611 |
| 5,495,152 | * | 2/1996 | Fukui .................................... 310/319 |
| 5,523,843 | * | 6/1996 | Yamane et al. ....................... 356/363 |
| 5,644,199 | * | 7/1997 | Nojima et al. ....................... 318/114 |

FOREIGN PATENT DOCUMENTS

| | | | |
|---|---|---|---|
| 58-14682 | 1/1983 | (JP) | ................................ H04N/5/30 |
| 58-148682 | 9/1983 | (JP) | ............................... H02N/11/00 |
| 59-204477 | 11/1984 | (JP) | ............................... H02N/11/00 |
| 60-176470 | 9/1985 | (JP) | ................................ H02N/2/00 |
| 63-1379 | 1/1988 | (JP) | ................................ H02N/2/00 |

* cited by examiner

Primary Examiner—Thomas M. Dougherty
(74) Attorney, Agent, or Firm—Fitzpatrick, Cella, Harper & Scinto

(57) ABSTRACT

When a fact that a motor cannot rotate at a target speed in a stationary state is detected by a speed controller (rotation control means, detecting means), this fact is alarmed to the operator. The rotational speed of the motor is switched to a different speed and the other drivers are also driven in accordance with the switched speed.

39 Claims, 12 Drawing Sheets

FIG. 8

| SPEED | LED IMAGE RECORDING SPEED | DRUM VOLTAGE | DEVELOPMENT BIAS VOLTAGE | | | | | | |
|---|---|---|---|---|---|---|---|---|---|
| STANDARD (V) | | | | 0.9×V | | | | | |
| THICK (1/2V) | | | | 0.8×V | | | | | |
| OHP (1/4V) | | | | ...... | ...... | ...... | 0.3×V | 0.2×V | 0.1×V |

801 / 802

MOTOR CONTROL APPARATUS AND IMAGE FORMING APPARATUS

BACKGROUND OF THE INVENTION

1. Field of the Invention

The invention relates to a motor control apparatus and an image forming apparatus using it.

2. Related Background Art

In an apparatus using a motor as a driving source, generally, it is required that a driving member which is driven by the motor is repetitively operated while keeping a predetermined precision level. Particularly, in an image forming apparatus in an electrophotographic system, to form an image of high precision, it is required to use a motor having higher rotating precision as a motor for driving a photosensitive member or for driving a transfer member. To accomplish such an object, an ultrasonic motor is used as a motor for driving the photosensitive member or for driving the transfer member.

The ultrasonic motor, is a motor using an ultrasonic vibration, proposed by JP-A-58-14682. As described in detail in JP-A-63-1379, JP-A-60-176470, JP-A-59-204477, or the like with respect to the driving of such a motor, a stable rotating performance of a constant speed is realized by periodically adjusting the drive frequency or the driving voltage and the pulse width of the driving voltage in accordance with a signal of speed detecting means, such as an encoder signal or the like.

On the other hand, abrasion of the motor of the apparatus and motor driving members, due to their use over a long period of time, which is caused by the occurrence of friction between the members when the motor of the apparatus and the motor driving members which are driven by the motor are made operative, is unavoidable. Even if a motor having high precision driving characteristics, such as an ultrasonic motor is used, such abrasion is not exceptional. Therefore, hitherto, when the abrasion of the motor driving members progresses and a stable constant speed rotation at a target speed in the stationary state becomes impossible, a countermeasure, such as replacement, reparation, or the like, by a serviceman or the like, is performed.

However, in the conventional motor control apparatus as mentioned above, the stable driving of the apparatus main body becomes disabled for a period of time until a countermeasure, such as replacement, reparation, or the like, by a serviceman or the like is performed after the stable rotation of the motor driving members becomes impossible due to the abrasion of the members. Particularly, in the case of an image forming apparatus having such a motor control apparatus, high quality image formation cannot be performed for such a period of time. It is therefore impossible to meet a requirement by the operator to form an image in urgent for the period of time until a countermeasure, such as replacement, reparation, or the like by a serviceman, is performed.

In an image forming apparatus for a business use or the like in which it is required that the apparatus always operates without a halt, there is a problem such that the usefulness of the apparatus is diminished due to the occurrence of the inoperative time.

SUMMARY OF THE INVENTION

The invention is made to solve the foregoing problems and it is an object to provide a motor control apparatus in which, when a stable rotation of a motor becomes impossible, the apparatus main body can be tentatively driven even for a period of time until a countermeasure such as replacement, reparation, or the like by a serviceman or the like is performed and to provide an image forming apparatus having such a motor control apparatus.

The motor control apparatus and image forming apparatus of the invention are constructed as follows.

(1) A motor control apparatus comprises: rotation control means for controlling a rotational speed of a motor; detecting means for detecting a rotation error of the motor; and alarm means for warning an operator when the rotation error of the motor is detected, wherein when the rotation error of the motor is detected, the rotational speed of the motor is switched to a different speed and the motor is driven and the other portions of the apparatus main body are also driven in accordance with the switched speed.

(2) In the motor control apparatus according to the above item (1), the rotation control means can switch the rotational speed of the motor to two or more speeds.

(3) In the motor control apparatus according to the above item (1) or (2), the apparatus has memory means constructed in a manner such that when the rotational speed of the motor is switched to the different speed and the motor is driven, two or more drive control conditions to drive the other portions of the apparatus main body in accordance with the switched speed have been stored.

(4) In the motor control apparatus according to any one of the above items (1) to (3), the rotation control means controls the rotational speed of the motor by a speed feedback control using a rotational speed detection signal.

(5) In the motor control apparatus according to any one of the above items (1) to (4), the detecting means detects the rotation error of the motor on the basis of the occurrence of a difference between the rotational speed which is obtained from a rotational speed detection signal, which is used in the rotation control of the motor, and the target rotational speed.

(6) In the motor control apparatus according to any one of the above items (1) to (5), the motor is an ultrasonic motor controlled by an ultrasonic vibration control.

(7) In the motor control apparatus according to the above item (6), a rotational speed detection signal, which is used for the rotation control of the ultrasonic motor, is an encoder output signal.

(8) In the motor control apparatus according to the above item (6) or (7), a control amount by the rotation control means is either one of or both of an ultrasonic wave pulse width and an ultrasonic wave frequency.

(9) In the motor control apparatus according to any one of the above items (1) and (3) to (8), the rotation control means continuously changes the rotational speed of the motor in such a direction as to be decelerated when the rotation error of the motor is detected.

(10) In the motor control apparatus according to the above item (9), when the rotational speed of the motor is switched to the different rotational speed and the motor is driven, a rule to calculate various set values, which are necessary to decide driving conditions for driving the other portions of the apparatus main body in accordance with the switched speed, has been stored as a predetermined formula into memory means, and the driving conditions, to drive the other portions of the apparatus main body, are continuously changed in accordance with the rotational speed of the motor.

(11) In the motor control apparatus according to any one of the above items (1) to (9) in response to an alarm by the alarm means, the apparatus has selecting means for enabling the operator to select whether the driving of the apparatus is interrupted or continued, thereby enabling the operator to select whether the driving of the apparatus by the speed switching is executed or not.

(12) In the motor control apparatus according to any one of the above items (1) to (11), the alarm means is provided for an operation panel annexed to the apparatus main body.

(13) In the motor control apparatus according to any one of the above items (1) to (12), the alarm means is a public telephone line communication terminal connected to the apparatus main body.

(14) In the motor control apparatus according to any one of the above items (1) to (13), the alarm means is a network communication terminal connected to the apparatus main body.

(15) An image forming apparatus for performing an image forming operation has a motor control apparatus comprising: rotation control means for controlling a rotational speed of a motor; detecting means for detecting a rotation error of the motor; and alarm means for warning an operator when the rotation error of the motor is detected, wherein when the rotation error of the motor is detected, the rotational speed of the motor is switched to a different speed and the motor is driven and the other portions of the apparatus main body are also driven in accordance with the switched speed.

(16) In the image forming apparatus having the motor control apparatus according to the above item (15), the motor is a photosensitive member driving motor or a transfer-member driving motor for rotating either one of or both of a photosensitive member and a transfer member.

(17) In the image forming apparatus having the motor control apparatus according to the above item (15) or (16), the rotation control means can switch the rotational speed of the motor to two or more speeds.

(18) In the image forming apparatus having the motor control apparatus according to any one of the above items (15) to (17), the motor control apparatus has memory means constructed in a manner such that when the rotational speed of the motor is switched to the different speed and the motor is driven, two or more drive control conditions to drive the other portions of the apparatus main body in accordance with the switched speed have been stored.

(19) In the image forming apparatus having the motor control apparatus according to any one of the above items (15) to (18), the rotation control means controls the rotational speed of the motor by a speed feedback control using a rotational speed detection signal.

(20) In the image forming apparatus having the motor control apparatus according to any one of the above items (15) to (19), the detecting means detects the rotation error of the motor on the basis of the occurrence of a difference between the rotational speed which is obtained from a rotational speed detection signal, which is used in the rotation control of the motor, and the target rotational speed.

(21) In the image forming apparatus having the motor control apparatus according to any one of the above items (15) to (20), the motor controlled is an ultrasonic motor by an ultrasonic vibration control.

(22) In the image forming apparatus having the motor control apparatus according to the above item (21), a rotational speed detection signal, which is used for the rotation control of the ultrasonic motor, is an encoder output signal.

(23) In the image forming apparatus having the motor control apparatus according to the above item (21) or (22), a control amount controlled by the rotation control means is either one of or both of an ultrasonic wave pulse width and an ultrasonic wave frequency.

(24) In the image forming apparatus having the motor control apparatus according to any one of the above items (16) to (23), the transfer member, which is driven by the transfer member driving motor, is a transfer drum.

(25) In the image forming apparatus having the motor control apparatus according to any one of the above items (16) to (24), the photosensitive member, which is driven by the photosensitive member driving motor, is a photosensitive drum.

(26) In the image forming apparatus having the motor control apparatus according to any one of the above items (18) to (25), the memory means stores drive control conditions for driving optical-image reading means for inputting an original image to form an image.

(27) In the image forming apparatus having the motor control apparatus according to any one of the above items (18) to (26), the memory means stores drive control conditions for driving developing means for performing a development to a photosensitive member to form an image.

(28) In the image forming apparatus having the motor control apparatus according to any one of the above items (18) to (27), the memory means stores drive control conditions for driving transfer processing means for forming an image.

(29) In the image forming apparatus having the motor control apparatus according to any one of the above items (18) to (28), the memory means stores drive control conditions for driving fixing processing means for forming an image.

(30) In the image forming apparatus having the motor control apparatus according to any one of the above items (15) to (29), the apparatus has a plurality of driving speed modes according to image forming conditions in a normal state, and when the rotation error of the motor is detected during an operation in a certain driving speed mode, this mode is switched to a mode in which the motor can be driven among the prepared driving speed modes in the normal state, thereby driving the motor.

(31) In the image forming apparatus having the motor control apparatus according to the above item (30), a plurality of driving speed modes are switched by using the difference between materials of media whose images are formed as a reference.

(32) In the image forming apparatus having the motor control apparatus according to the above item (31), the reference, to determine the difference between the materials of the media whose images are formed when the driving speed modes are switched, is set on the basis of, particularly, a discrimination about whether the medium is an OHP film or a paper.

(33) In the image forming apparatus having the motor control apparatus according to the above item (31), the reference, to determine the difference between the materials of the media whose images are formed when the driving speed modes are switched, is set to, particularly, a thickness of the medium.

(34) In the image forming apparatus having the motor control apparatus according to any one of the above items (15) to (33), the rotation control means continuously changes the rotational speed of the motor in such a direction as to be decelerated when the rotation error of the motor is detected.

(35) In the image forming apparatus having the motor control apparatus according to the above item (34), when the rotational speed of the motor is switched to the different rotational speed and the motor is driven, a rule to calculate various set values, which are necessary to decide driving conditions for driving the other portions of the apparatus main body in accordance with the switched speed, has been stored as a predetermined formula into memory means, and the driving conditions to drive the other portions of the apparatus main body are continuously changed in accordance with the rotational speed of the motor.

(36) In the image forming apparatus having the motor control apparatus according to any one of the above items (15) to (35), the apparatus has selecting means for enabling the operator to select whether the driving of the apparatus is interrupted or continued in response to an alarm by the alarm means, thereby enabling the operator to select whether the driving of the apparatus by the speed switching is executed or not.

(37) In the image forming apparatus having the motor control apparatus according to any one of the above items (15) to (36), the alarm means is provided for an operation panel annexed to the apparatus main body.

(38) In the image forming apparatus having the motor control apparatus according to any one of the above items (15) to (37), the alarm means is a public telephone line communication terminal connected to the apparatus main body.

(39) In the image forming apparatus having the motor control apparatus according to any one of the above items (15) to (38), the alarm means is a network communication terminal connected to the apparatus main body.

As described above, according to the invention, the motor control apparatus comprises: rotation control means for controlling a rotational speed of a motor; detecting means for detecting a rotation error of the motor; and alarm means for warning an operator when the rotation error of the motor is detected, wherein when the rotation error of the motor is detected, the rotational speed of the motor is switched to a different speed and the motor is driven and the other portions of the apparatus main body are also driven in accordance with the switched speed. Therefore, there is an advantage such that when the stable rotation of the motor becomes impossible, the apparatus main body can be tentatively driven even for a period of time until a countermeasure, such as replacement, reparation, or the like by a serviceman or the like, is performed.

BRIEF DESCRIPTION OF THE DRAWINGS

FIG. 8 is a diagram showing data of each control parameter in the embodiment;

DETAILED DESCRIPTION OF THE PREFERRED EMBODIMENTS

Figure 1:
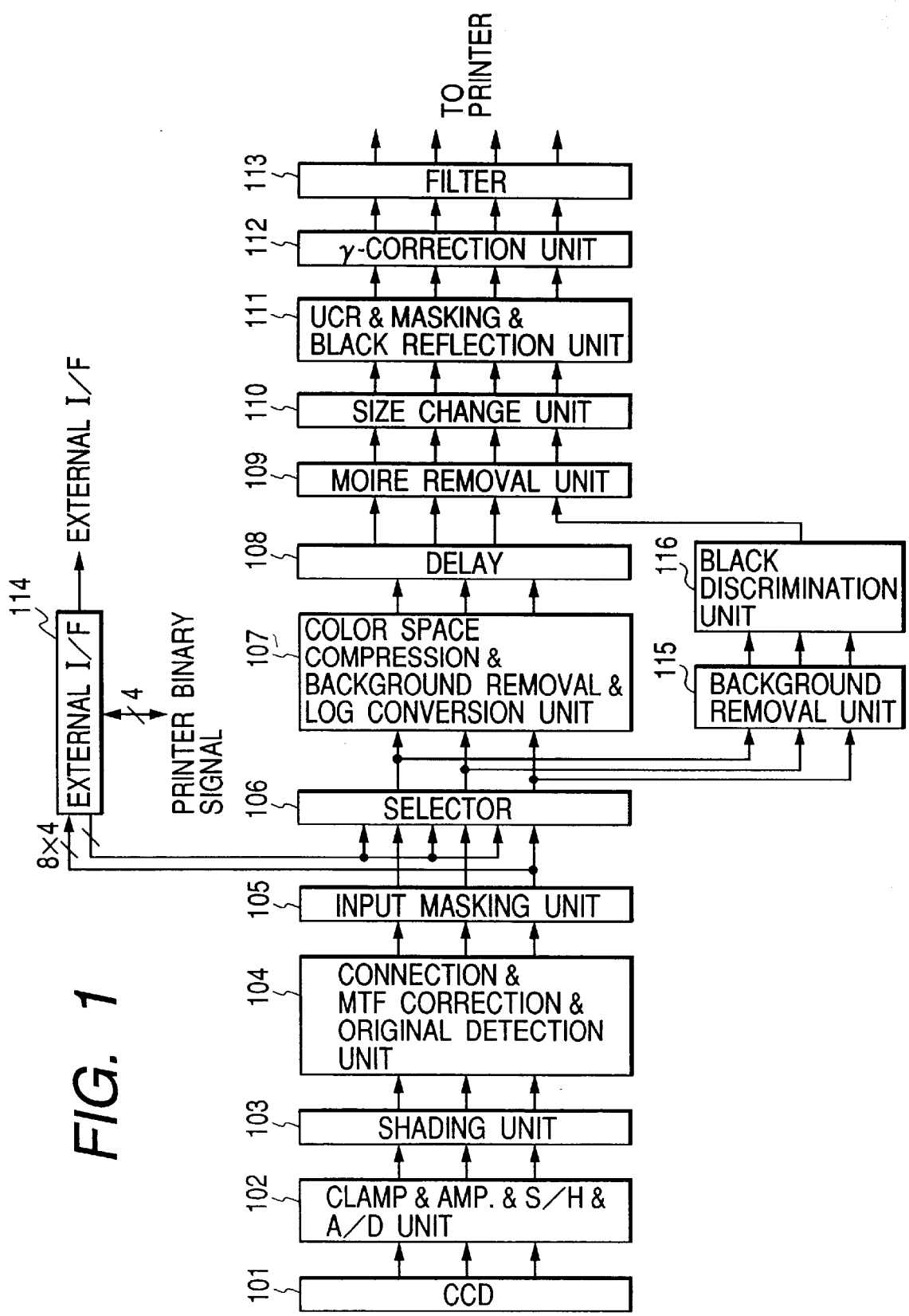
FIG. 1 is a block diagram showing a construction of an image processor in an embodiment.
Figure 2:
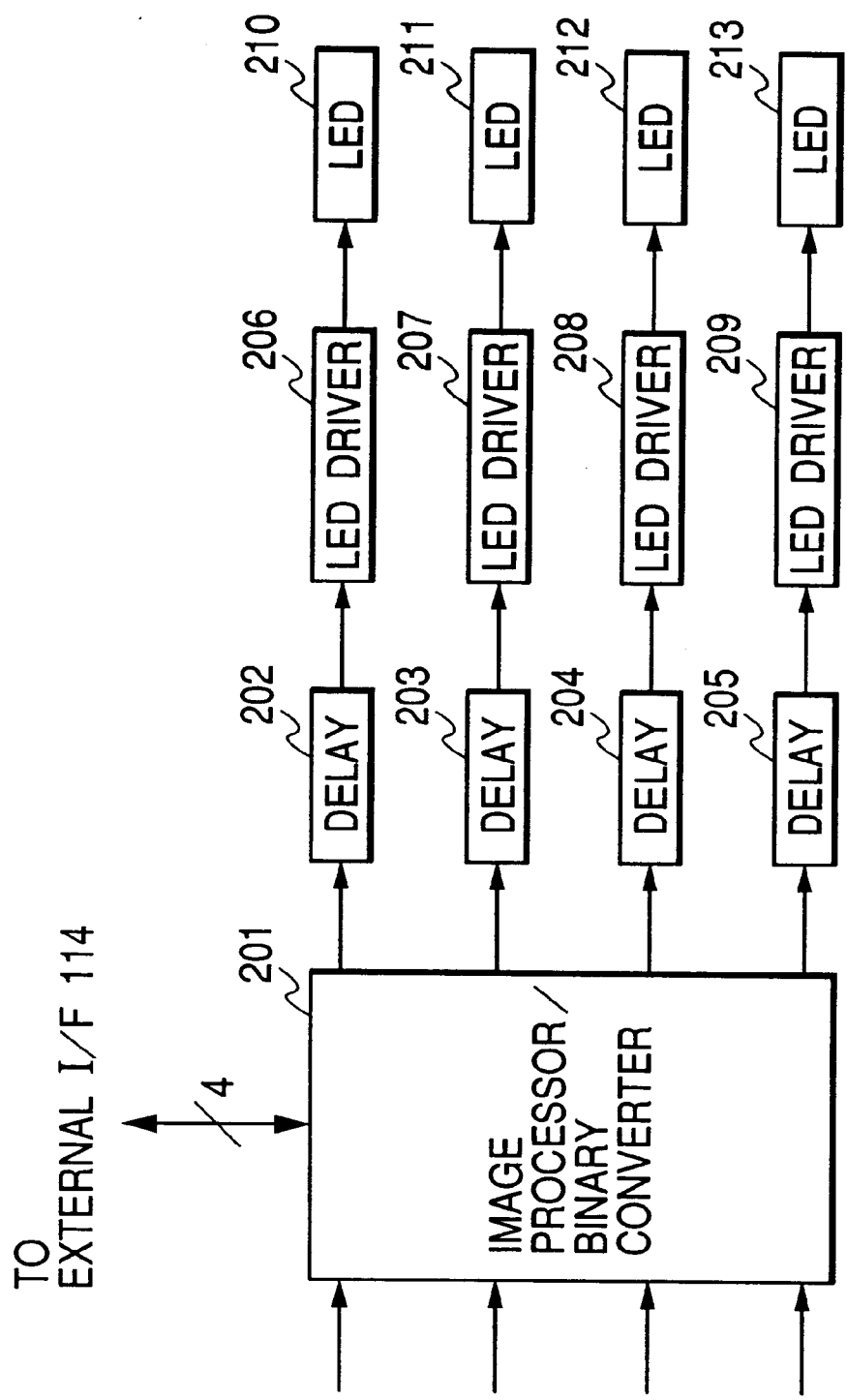
FIG. 2 is a block diagram showing a construction of a printer processor in the embodiment.
Figure 3:
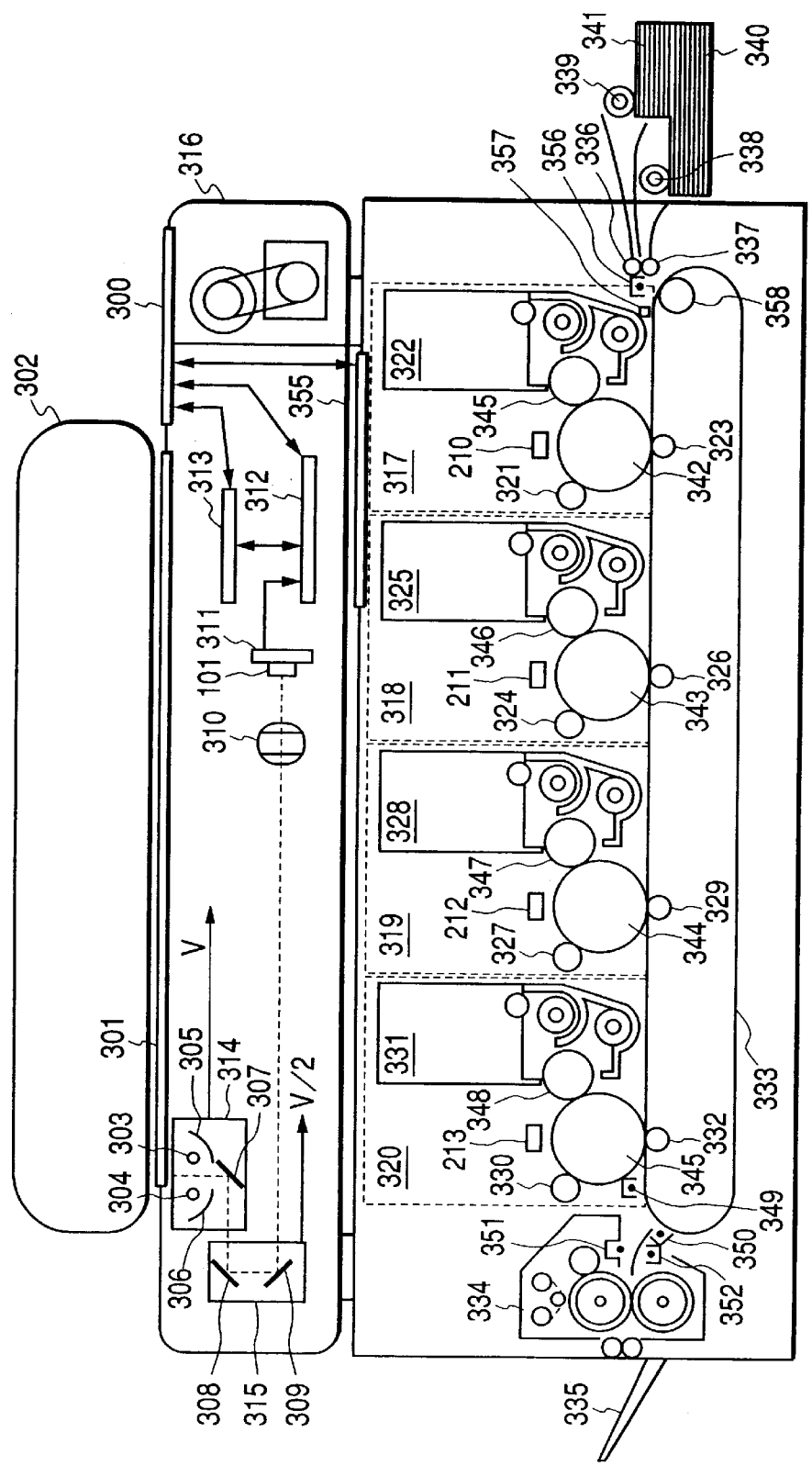
FIG. 3 is a cross sectional view showing a whole construction of an image forming apparatus in the embodiment.

FIGS. 1 to 3 are diagrams showing the construction of an image forming apparatus according to an embodiment of the invention and a fundamental construction will now be described with reference to those diagrams.

A construction of a color reader will be first explained.

FIG. 3 is a cross sectional view showing the whole construction of the image forming apparatus.

In the diagram, reference numeral 101 denotes a CCD; 311 denotes a board on which the CCD 101 is mounted; 300 denotes a control unit for controlling the whole image forming apparatus; 312 denotes a digital image processor including the portions excluding the image processor 101 in FIG. 1 and also including the portion of an image processor/binary converter 201 and delays 202 to 205 in FIG. 2; 301 denotes an original supporting glass plate (platen); 302 denotes a document feeder (DF) (there is also a construction such that a mirror surface pressing plate (not shown) is attached in place of the document feeder 302); 303 and 304 denote light sources (halogen lamps or fluorescent lamps) for irradiating the original; 305 and 306 denote reflecting parasols for converging the light of the light sources 303 and 304 onto the original; and 307 to 309 denote mirrors.

Reference numeral 310 denotes a lens for converging the reflection light or projection light from the original onto the CCD 101; 314 denotes a carriage for enclosing the halogen lamps 303 and 304, reflecting parasols 305 and 306, and mirror 307; 315 denotes a carriage for enclosing the mirrors 308 and 309; and 313 denotes an external interface (I/F) with the other devices. The carriage 314 mechanically moves at a speed V and the carriage 315 mechanically moves at a speed V/2 in the direction perpendicular to the electrical scanning (main scanning) direction of the CCD 101, thereby scanning (subscanning) whole the surface of the original.

Figure 4:
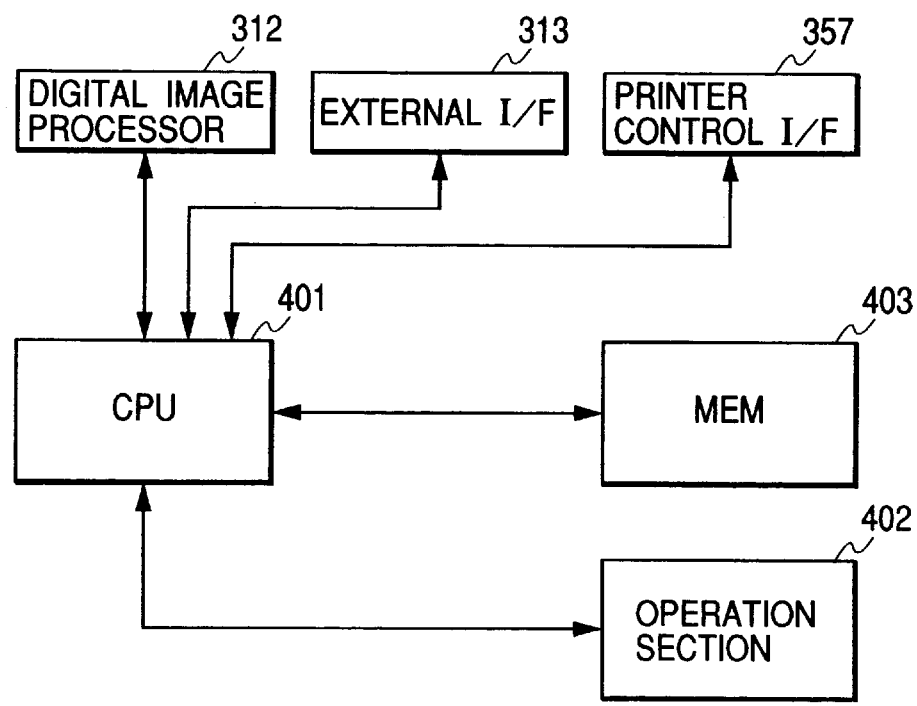
FIG. 4 is a block diagram showing a construction of a controller in the embodiment.

As shown in FIG. 4, the control unit 300 is constructed by: a CPU 401 having interfaces (I/F) for transmitting information to perform a control to each of the digital image processor 312, the external I/F 313, and a printer control I/F 353; an operation section 402; and a storing apparatus 403.

The operation section 402 is constructed by a liquid crystal with a touch panel for information notification regarding an input of processing execution contents by the operator or processes to the operator. Various control parameters regarding the image forming apparatus have been stored in a storing apparatus (memory means) 403. The control parameters are read out by the CPU 401 as necessary and used for various controls. The specific contents of the control parameters will be explained in detail hereinbelow.

Figure 5:
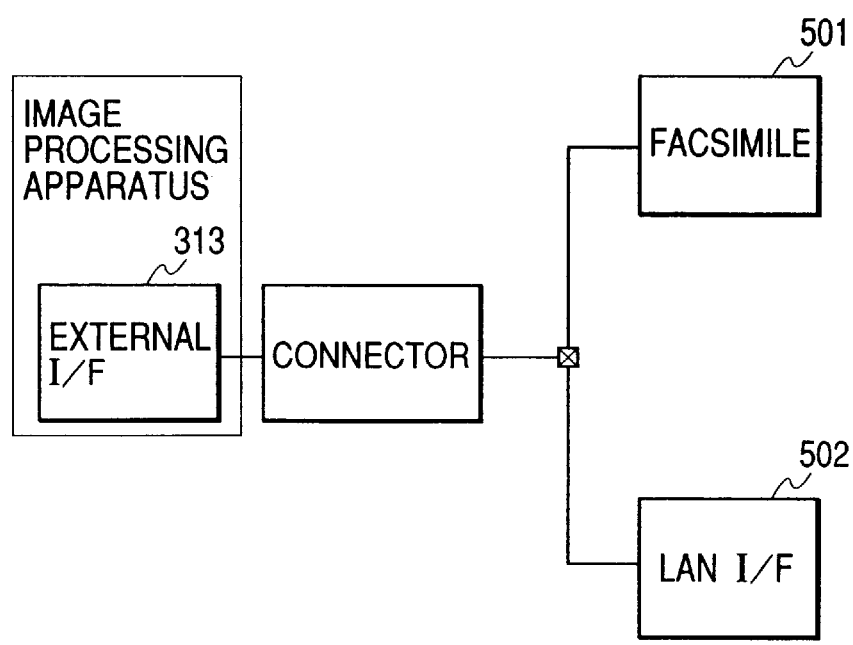
FIG. 5 is a block diagram showing a construction of an interface in the embodiment.

The external I/F 313 is an interface to transmit and receive image information, code information, and the like to/from the outside of the image processing apparatus. Specifically speaking, as shown in FIG. 5, a facsimile 501, an LAN interface 502, or the like can be connected via the external I/F 313. The transmission and reception procedure control of the image information and code information to/from the facsimile 501 or LAN I/F 502 is executed by a mutual communication between the facsimile 501 and LAN I/F 502 serving as connecting apparatuses and the CPU 401 of the control unit 300.

The digital image processor 312 will now be described in detail. FIG. 1 is a block diagram showing a detailed construction of the digital image processor 312.

As shown in the diagram, an original on the original supporting glass plate reflects the light from the light sources 303 and 304 and its reflection light is led to the CCD 101 and is converted to an electric signal (in case of a color sensor as a CCD 101, it is possible to use a CCD having any one of a construction such that color filters of R, G, and B are sequentially arranged in a line on a 1-line CCD in accordance with the order of R, G, and B, a construction of a 3-line CCD such that an R filter, a G filter, and a B filter are arranged every CCD, and a construction such that the filters are formed as an on-chip or the filters are constructed separately from the CCD).

The electric signal (analog image signal) is inputted to the digital image processor 312 and is sampled and held (S/H), is clamped while using the dark level of an analog image signal as a reference voltage, is amplified to a predetermined amount (the order of those processes is not limited to the order shown), and is A/D converted to, for example, digital signals of R, G, and B, each consisting of eight bits by a clamp & amplifying & S/H & A/D unit 102.

The RGB signals are subjected to a shading correction and a black correction by a shading unit 103. After that, the corrected signals are supplied to a connection & MTF correction & original detection unit 104. In the case where the CCD 101 is a 3-line CCD, as for the connecting process, since the reading positions between the lines differ, a delay amount of each line is adjusted in accordance with a reading speed, and signal timings are corrected so that the reading positions of three lines coincide. As for the MTF correction, since the reading MTF differs depending on the reading speed or zoom magnification, the MTF change is corrected and the original on the original supporting glass plate in the original detection is scanned, thereby recognizing the original size.

The digital signals in which the reading position timings have been corrected are supplied to an input masking unit 105, by which spectrum characteristics of the CCD 101 and spectrum characteristics of the light sources 303 and 304 and reflecting parasols 305 and 306 are corrected. Outputs of the input masking unit 105 are inputted to a selector 106 which can switch an external I/F signal. Signals outputted from the selector 106 are inputted to a color space compression & background removal & LOG conversion unit 107 and a background removal unit 115.

After the background colors were removed from the signals inputted to the background removal unit 115, the resultant signals are inputted to a black discrimination unit 116 to discriminate whether the input signals indicate a black character in the original or not. A black character signal is formed from the original. In the color space compression & background removal & LOG conversion unit 107 to which the other outputs of the selector 106 were inputted, a check is made to see if the read image signals, which were color space compressed, lie within a range where they can be reconstructed by a printer. If YES, the image signals are outputted as they are. If NO, the image signals are corrected so as to lie within the range where they can be reconstructed by the printer.

The background color is removed and the resultant signals are converted from the RGB signals to CMY signals by the LOG conversion. A timing of a signal formed by the black discrimination unit 116 and timings of output signals of the color space compression & background removal & LOG conversion unit 107 to correct the timings are adjusted by a delay 108. Moires are removed from the above two kinds of signals by a moire removal unit 109 and the resultant signals are zoomed in the main scanning direction by a size change unit 110.

Reference numeral 111 denotes a UCR & masking & black reflection unit. In the signals processed by the size change unit, CMYK signals are formed from the CMY signals by a UCR process. The CMYK signals are subjected to a signal correction by a masking processor in accordance with an output of the printer. A discrimination signal, formed by the black discrimination unit 116, is fed back to the CMYK signals.

The signals processed by the UCR & masking & black reflection unit 111 are density adjusted by a γ-correction unit 112 and, after that, are smoothing or edge processed by a filter 113. The resultant processed signals are converted from the 8-bit multivalue signals to binary signals by the image processor/binary converter 201. (Any one of the dither method, the error diffusion method, and the improved error diffusion method can be used as a converting method.)

Subsequently, the construction of the printer will now be described. In FIG. 4, reference numeral 353 denotes the printer control I/F serving as a receiving port of a control signal from the CPU 401 of the color reader. The printer will now be described hereinbelow on the basis of a control signal from the printer control I/F 353.

The construction of the printer will be subsequently explained. In FIG. 4, reference numeral 353 denotes the printer control I/F serving as a receiving port of a control signal from the CPU 401 of the color reader. The printer executes the operation, which will be explained hereinbelow, on the basis of a control signal from the printer control I/F 353.

Subsequently, the image forming unit will be described in detail. In FIG. 3, reference numeral 317 denotes an M image forming unit; 318 a C image forming unit; 319 denotes a Y image forming unit; and 320 denotes a K image forming unit. Since all of the constructions of the image forming units 317 to 320 are the same, only the M image forming unit 317 will be described in detail hereinbelow and the explanation of the other image forming units is omitted.

In the M image forming unit 317, reference numeral 342 denotes a photosensitive drum. A latent image is formed on the surface of the photosensitive drum 342 by the light from an LED array 210. Reference numeral 321 denotes a primary charging unit for charging the surface of the photosensitive drum 342 to a predetermined voltage, thereby preparing to form a latent image. Reference numeral 322 denotes a developer for developing the latent image on the photosensitive drum 342, thereby forming a toner image.

A sleeve 385 for applying a developing bias and developing the latent image is included in the developer 322. Reference numeral 323 denotes a transfer charging unit for discharging from the back surface of a transfer belt 333 and transferring the toner image on the photosensitive drum 342 onto a recording paper or the like on the transfer belt 333. Since the transfer efficiency of the embodiment is high, no cleaner unit is arranged (it will be obviously understood that even if the cleaner unit is attached, there will be no problem).

A procedure for forming an image onto the recording paper or the like will now be described. The recording papers or the like, enclosed in a cassette 340 or 341, are picked up, one by one, by a pickup roller 338 or 339 and are fed onto the transfer belt 333 by a feed roller 336 or 337. The fed recording paper is charged by an adsorption charging unit 356. Reference numeral 358 denotes a transfer belt roller for driving the transfer belt 333 and charging the recording paper or the like together with the adsorption charging unit 356 as a pair, thereby adsorbing the recording paper or the like onto the transfer belt 333. Reference numeral 357 denotes a paper front edge sensor for detecting a front edge of the recording paper or the like on the transfer belt 333. A detection signal of the paper front edge sensor 357 is sent from the printer to the color reader and is used as a subscan sync signal when the video signal is transmitted from the color reader to the printer.

After that, the recording paper or the like is conveyed by the transfer belt 333 and toner images are sequentially formed on the surface of the recording paper or the like by the image forming units 317 to 320 in accordance with the order of MCYK. The recording paper or the like, which passed through the K image forming unit 320, is discharged by a discharging unit 349 in order to make it easy to separate the recording paper from the transfer belt 333. After that, the recording paper is separated from the transfer belt 333. Reference numeral 350 denotes a peel-off charging unit for preventing an image disturbance due to a peel-off discharge when the recording paper or the like is separated from the transfer belt 333. The separated recording paper or the like is charged by a pre-fixing charging unit 351 or 352 in order to prevent the image disturbance by supplementing an adsorbing force of the toner. After that, the toner image is thermally fixed by a fixing unit 334 and the recording paper is subsequently ejected to an ejection tray 335.

FIG. 2 is a block diagram showing a detailed construction of the digital image processor. An LED image recording will now be described with reference to FIG. 2. By adjusting the differences of the distances between the paper front edge sensor 357 and the image forming units by the delays 202 to 205 on the basis of a paper front edge signal from the paper front edge sensor 357, respectively, the binary image signals of four colors of CMYK formed by the image processor/binary converter 201 in FIG. 2 can be printed at predetermined positions. LED drivers 206 to 209 generate signals to drive LED arrays 210 to 213.

In the embodiment, ultrasonic motors are used as driving motors to rotate photosensitive drums 342 to 345 and the transfer belt 333. An ultrasonic motor is a motor using a ultrasonic vibration and a drive frequency or a driving voltage or a pulse width of the driving voltage is controlled in accordance with a speed detection signal to stably rotate the motor at a constant speed.

Figure 6:
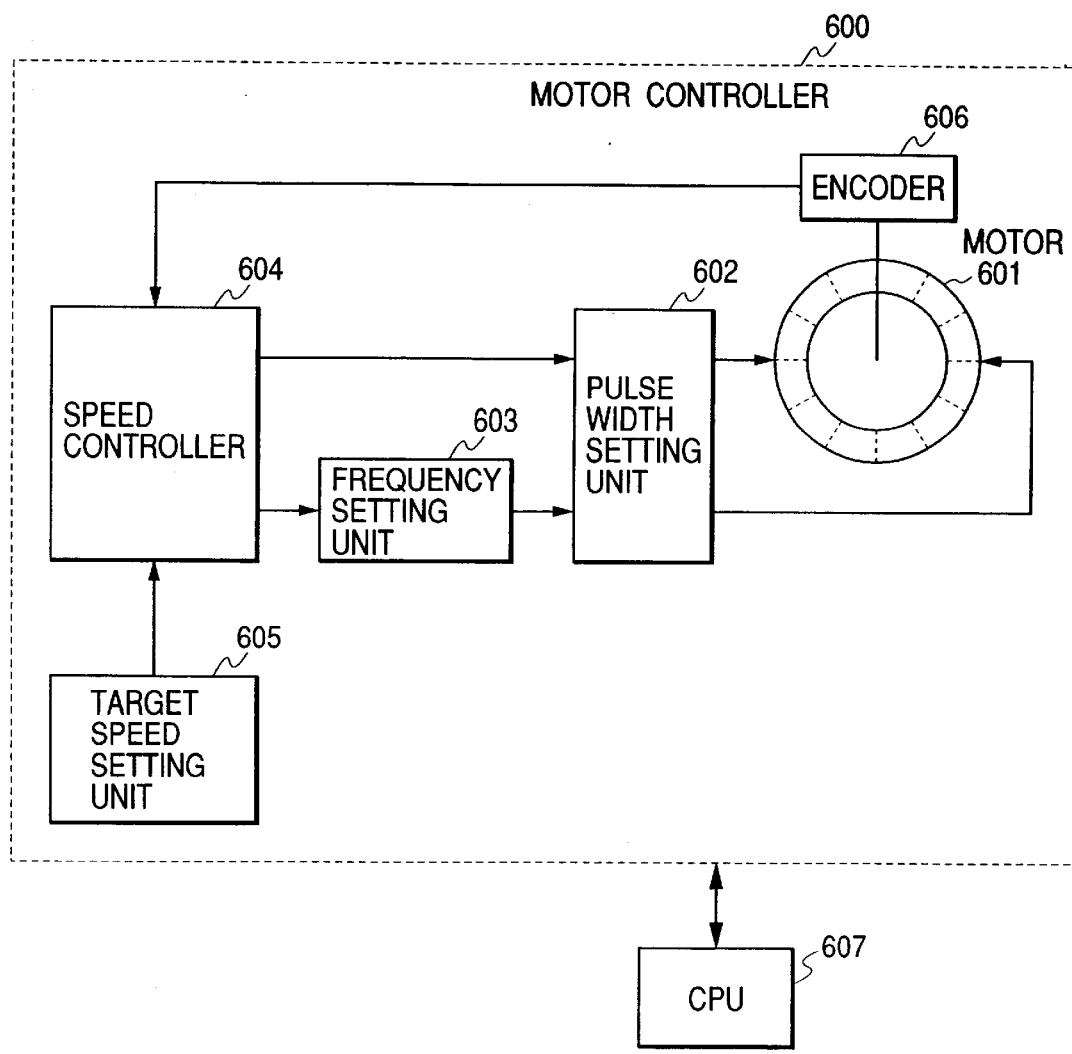
FIG. 6 is a block diagram showing a control construction of a ultrasonic motor in the embodiment.

A control method of the ultrasonic motor will be described hereinbelow. FIG. 6 is a block diagram for explaining an embodiment of the control method of the ultrasonic motor.

In FIG. 6, reference numeral 600 denotes a motor controller for driving the ultrasonic motor and 601 indicates a ultrasonic motor. An encoder 606 is connected to the motor 601 and the number of rotations is inputted to a speed controller 604. The speed controller (rotation control means) 604 controls a frequency setting unit 603 and a pulse width setting unit 602 on the basis of the number of rotations of the encoder so as to rotate the motor at a rotational speed set by a target speed setting unit 605.

A target speed which is set in the target speed setting unit 605 is set by a CPU 607. The speed controller 604 (detecting means) has a function to discriminate whether an error has occurred in the constant speed rotation on the basis of a magnitude of a deviation between the target speed set by the target speed setting unit 605 and the actual speed which is obtained from the number of rotations by an output from the encoder 606. A discrimination result is notified to the CPU 607.

Figure 7A:
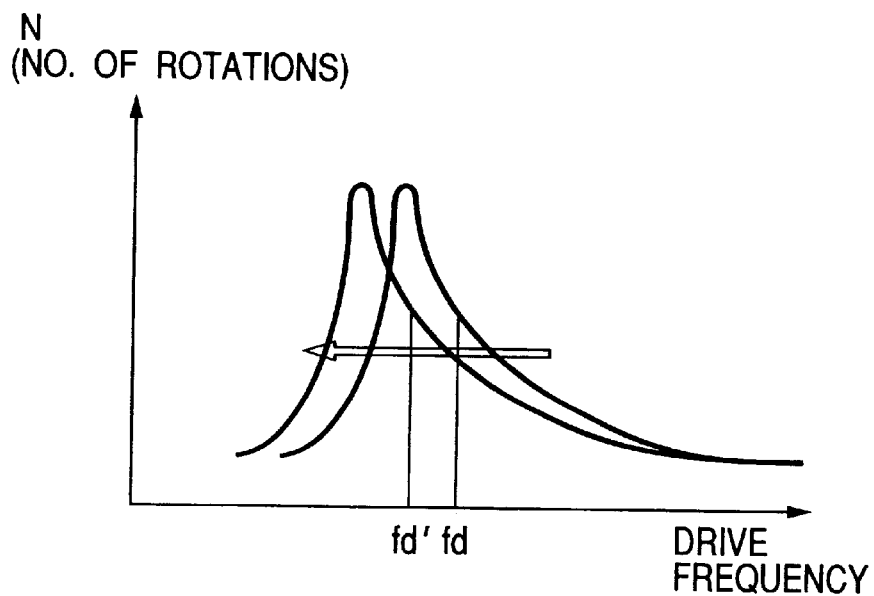
FIGS. 7A and 7B are diagrams showing the relations between a drive frequency of the ultrasonic motor and the number of rotations.
Figure 7B:
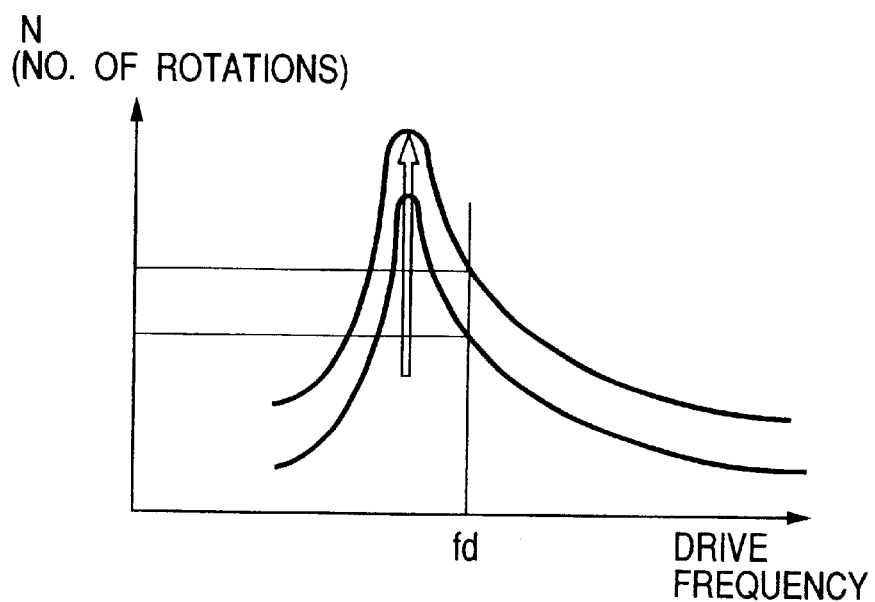

There are relations as shown in FIGS. 7A and 7B between the drive frequency and the number of rotations of the ultrasonic motor. The curve showing the relation has characteristics which move in the direction shown by an arrow in FIG. 7A as a temperature rises. This curve moves in the direction shown by an arrow in FIG. 7B by widening the drive pulse width (equivalent to the rising of the voltage). Therefore, to keep the constant number of rotations for the increase in temperature mentioned above, it is sufficient to widen the drive pulse width. However, since there is a limitation when the speed is corrected by only the pulse width, when a deviation of the characteristics increases, it is impossible to perform the correction due to merely such a large deviation.

It is, therefore, necessary to change the drive frequency to trace the speed. However, the change in drive frequency causes a change in vibrating characteristics which are peculiar to the motor, resulting in the possibility of a deterioration in the of a copy image.

It is, accordingly, necessary to pay attention such that the correction by the change in drive frequency is not performed for a period of time during which the latent image is formed on the surface of the photosensitive drum or the like.

In the ultrasonic motor in the embodiment, as already mentioned in detail, the stable rotational speed control is executed by the speed feedback control such that the drive frequency and the driving voltage or the pulse width of the driving voltage are controlled in response to the speed detection signal.

Since the ultrasonic motor has the characteristics such that the higher output rotation can be performed at a low speed, the stable rotation at a lower speed can be performed as compared with a pulse motor, a DC motor, or the like.

In the embodiment, although the thermal fixing is performed by the fixing unit 334 to the recording medium on which the toner image has been formed, a fixing property of the toner image is not always constant in dependence on a raw material, a thickness, or the like of the recording medium.

For example, when the recording medium is an OHP film or a relatively thick paper, a sufficient fixing property cannot be obtained unless a higher more heat amount is applied to the recording medium and the image is fixed as compared with the case of a normal paper.

To increase the heat amount which is applied in accordance with the recording medium, it is the simplest method to raise a fixing temperature of the fixing unit. However, such a method increases the maximum electric power consumption of the whole apparatus and it is necessary to set the performance of a heater of the fixing unit 334 to a higher performance. Thus, this method is not a better way in consideration of the costs.

Or, there is also a method of increasing the heat amount which is given to the recording medium by setting a conveying speed upon fixing of the recording medium to a low speed.

In the case where the distance between the fixing unit 334 and transfer belt 333 is sufficiently assured as compared with a length of recording medium, usually, after the image formation was finished and the recording medium was perfectly ejected from the transfer belt 333, the fixing process is started. Therefore, it is sufficient to merely switch only the rotational speed of the fixing unit 334 in accordance with the recording medium.

However, in the embodiment, since the distance between the fixing unit 334 and the transfer belt 333 is fairly shorter than that of the image forming apparatus having a construction similar to the conventional one, it is impossible to increase the speed difference between both members of the fixing unit 334 and transfer belt 333 during the conveyance of the recording medium.

To perform similar processes, therefore, it is necessary to also set the rotational speeds of the transfer belt 333 and photosensitive drums 342 to 345, in which high precision rotating performance is required, in accordance with the recording medium, namely, an image forming speed and an image transfer speed to low speeds in accordance with the fixing unit 334.

The embodiment, therefore, has the function for driving in the recording mode in which image forming speed is equal to ½ of the speed in the normal state in case of using a thick paper as a recording medium and for forming an image in the recording mode in which the image forming speed is equal to ¼ of that in the normal state in case of using an OHP film as a recording medium. In this case, however, as mentioned above, by using the ultrasonic motors of excellent low speed rotating characteristics for the transfer belt 333 and the photosensitive drums 342 to 345, high driving characteristics can be maintained in any mode.

The execution of the speed switching of the photosensitive drums 342 to 345 and the transfer belt 333 by the above function is substantially equivalent to the execution of the switching of the image forming speed itself. In this case, the speed at which the image is formed onto the photosensitive drum 342 in the printer and the speed at which the image is transferred onto the paper which is conveyed on the transfer belt 333 also change.

In such a case as well, to always keep the predetermined image quality or higher, in correspondence to the speed change, it is necessary to change various control parameters such as (1) parameters regarding the photosensing and developing processes on the photosensitive drum 342, such as LED image recording speeds of the LED arrays 210 to 213, drum voltages, development bias voltages, and the like, (2) parameters regarding the transferring process on the transfer belt 333 such as a paper charging voltage and the like, and (3) parameters regarding the fixing process on the fixing unit 334 such as a fixing voltage and the like.

Even in the color reader as well, further, to cope with a change in image forming speed in the printer, it is necessary to change parameters such as scanning speed of the original, illuminance of the light source, shading correction value in the shading unit 103, and the like. Such various control parameters corresponding to the driving speeds of the ultrasonic motors to drive the photosensitive drums 342 to 345 and the transfer belt 333 have previously been stored in the storing apparatus 403 as a data table corresponding to the driving speed of the ultrasonic motor.

FIG. 8 shows a part of outline of a data table 801 in each of the recording modes of the ½ speed and ¼ speed.

In case of performing the image formation in the image processing apparatus having a construction as mentioned above, friction always occurs between the photosensitive drums 342 to 345 and the transfer belt 333. Therefore, it is impossible to avoid abrasion of the surfaces of the photosensitive drums 342 to 345 and the transfer belt 333 due to the use for a long period of time. However, even if the correction control by the drive frequency and the drive pulse is executed due to the progress of the abrasions, it is difficult to rotate at a constant speed the ultrasonic motors for driving the photosensitive drums 342 to 345 or the transfer belt 333 at the target speed.

Even in such a case, however, by reducing the target rotational speed, there is a possibility such that the stable constant speed rotation can be performed for a time so long as it is a short time.

Therefore, the ultrasonic motor controller used in the embodiment has a control mode in which the operation at a plurality of rotational speeds can be performed in the case where an error occurs in the rotation driving of the ultrasonic motor. Specifically speaking, in the embodiment, the ultrasonic motors to drive the photosensitive drums 342 to 345 and transfer belt 333 have a plurality of driving modes upon the occurrence of an error in which the motor is driven at speeds of ten stages of 0.9×V, 0.8×V, 0.7×V, 0.6×V, 0.5×V, 0.4×V, 0.3×V, 0.2×V, and 0.1×V for an ordinary constant rotation driving speed V. Those speeds can be switched by changing the speed which is set into the target speed setting unit 605 by the CPU 607 as necessary.

In this case as well, in a manner similar to the ½ speed recording mode and ¼ speed recording mode described in detail above, it is necessary to change the parameters such as the image forming speed, the image transfer speed, and further, the scanning speed of the original in the color reader, illuminance of the light source, the shading correction value, and the like in accordance with the recording mode. Those various control parameters in the driving modes at the time of error have also previously been stored in the storing apparatus 403 in a manner similar to the cases of the ½ and ¼ speed recording modes.

FIG. 8 shows a part of an outline of a data table 802 in the driving modes at the time of error.

Figure 9:
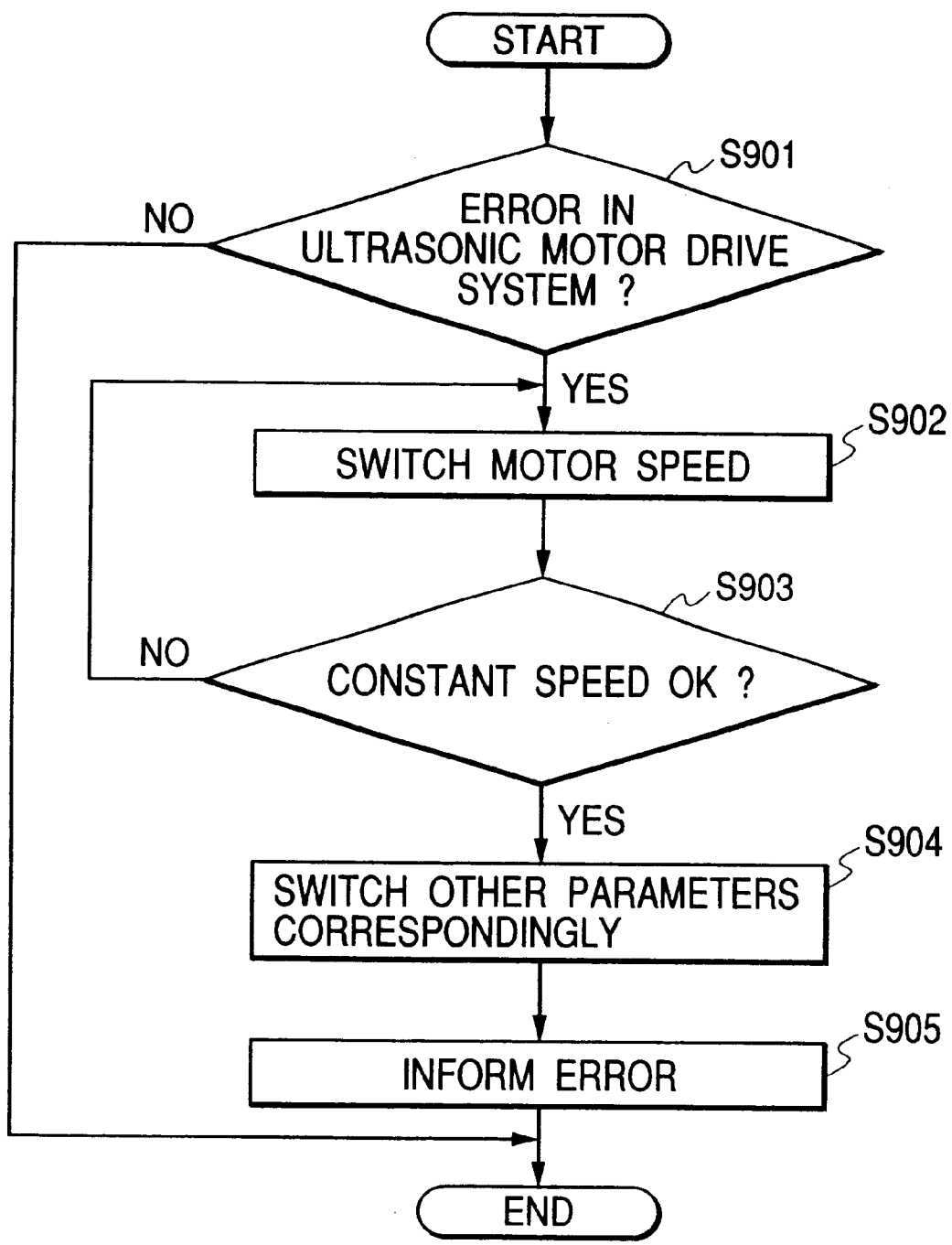
FIG. 9 is a flowchart showing the driving control operation of a motor in the embodiment.

In the image forming apparatus with the construction as mentioned above, as a countermeasure, in the case where since the abrasion of the surface of the photosensitive drum 342 or transfer belt 333 progresses, even if the correction by the drive frequency and drive pulse of the ultrasonic motor serving as a driving source is executed, the constant speed rotation at the target speed becomes impossible, and such a fact is alarmed to the operator and the tentative low constant speed driving is performed, thereby preventing the occurrence of the worst situation such that the driving of the apparatus perfectly becomes disabled. A procedure for such a case will now be described in detail hereinbelow with reference to a flowchart of FIG. 9.

First in step S901, a check is made to see if some error has occurred with respect to the driving system of the ultrasonic motor by the function of the speed controller 604. As mentioned before, the speed controller 604 has the function for correcting the deviation between the target speed set by the target speed setting unit 605 and the actual speed which is obtained from the number of rotations due to the output from the encoder 606 by controlling the frequency setting unit 603 and pulse width setting unit 602. However, in the present control system, a frequency (lowest frequency) which ought not to be reduced to this frequency or lower in the ordinary control state is preliminarily examined. In the case where even if the frequency exceeded the lowest frequency during the actual control, the target speed cannot be realized yet, the occurrence of the error is determined and the processing routine advances to step S902. On the other hand, when no error is particularly found here, the process is finished.

In step S902, a switching process of the target speed is performed. The speed that is lower than the current rotational speed by one stage is first newly selected as a target speed. In the embodiment, the next second lower speed $V_1=0.9 \times V_0$ for a standard target speed $V_0$ is first selected.

Subsequently, in step S903, whether the constant speed rotation driving can be performed for the new target speed designated in step S902 or not is examined by actually rotating the motor at the constant speed by the speed controller 604. If YES, step S904 follows. When the constant speed rotation is still impossible, however, the processing routine is again returned to step S902. The further lower speed by one stage, namely, $V_n = V_{n-1} - 0.1 \times V_0$ is selected as a new target speed and the process in step S903 is again executed. The processes in steps S902 to S903 are repeated until the speed at which the constant speed rotation is possible is selected.

If the constant speed rotation is impossible here for all of the target speeds, it is regarded that a serious error has occurred, so that a proper countermeasure is again taken. However, since such a situation is not a main viewpoint which should be discussed in the embodiment, its details are omitted here.

In step S904, the decided new target speed $V_n$ is notified to the CPU 401 of the control unit 300 from the CPU 607. The CPU 401 extracts various control parameters corresponding to the new target speed $V_n$ from the data table 802 upon motor error driving in the storing apparatus 403. In accordance with the extracted control parameters, the CPU 401 again executes the settings of the photosensing and developing processes, the transfer process, the fixing process, the and the like with respect to the printer, the setting of the scanning speed of the original, illuminance of the light source, shading correction value in the shading unit 103, and the like with respect to the color reader, and the like.

By the process in step S904, it is possible to cope with the changes of the various control conditions in association with the fluctuation in image forming speed, thereby preventing the deterioration in image quality due to the execution of the image formation at a speed different from the ordinary speed.

By the processes in steps S901 to S904 as mentioned above, tentative image formation can be performed at a speed although it is different from that upon ordinary image formation. However, this procedure is not a normal process as compared with the inherent image formation and a countermeasure such as reparation, replacement, or the like is needed for the ultrasonic motors in which the stationary rotation at the target speed in the stationary state became disabled and which are used to drive the photosensitive drums 342 to 345 and the transfer belt 333.

Figure 10:
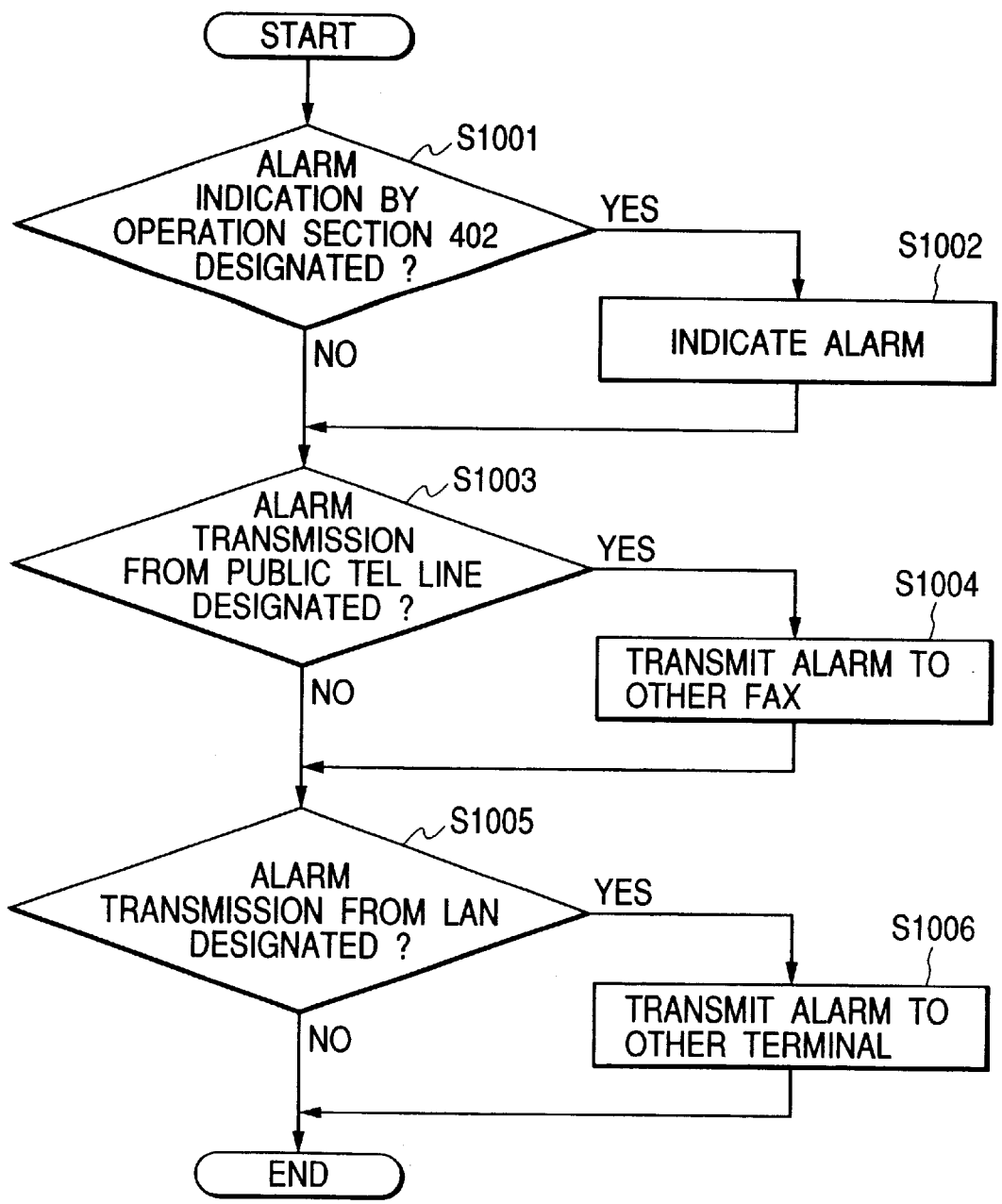
FIG. 10 is a flowchart showing the notification processing operation in the embodiment.

For this purpose, in step S905, a process to notify the operator or manager of the fact that the error occurred is executed. This process will now be described in detail with reference to FIG. 10 showing a processing flow in step S905.

Figure 11:
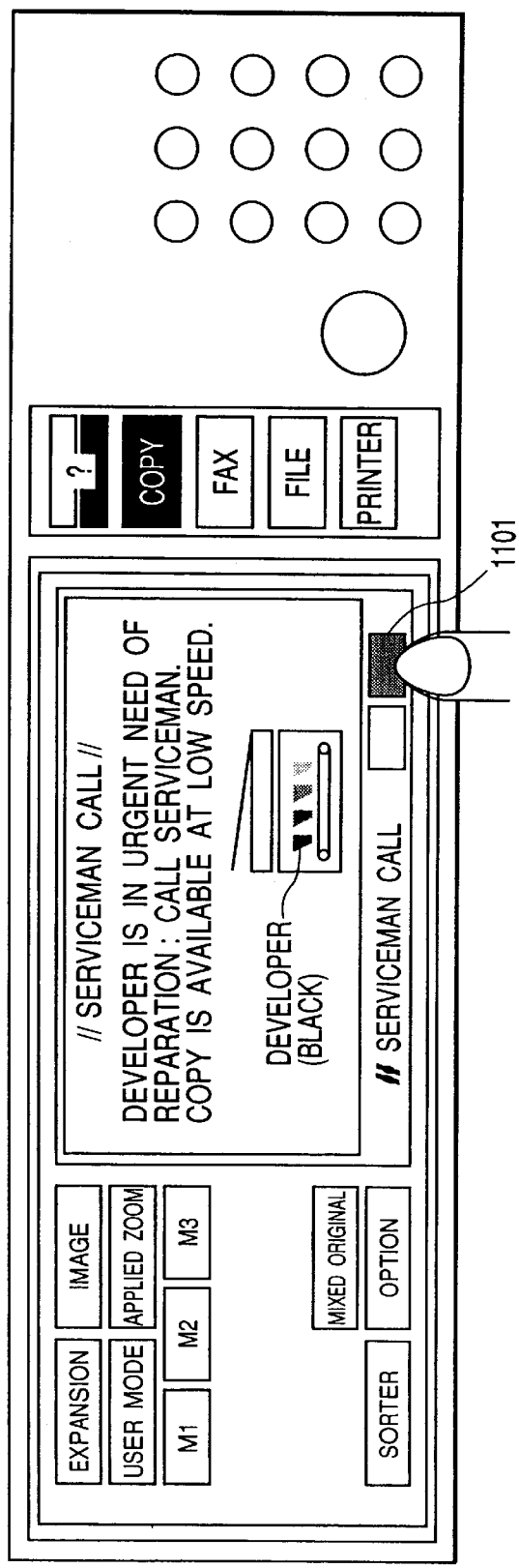
FIG. 11 is a diagram showing an alarm display in the embodiment.

First in step S1001, a check is made to see if an alarm indication by the operation section (alarm means) 402 has been instructed. If it is instructed, step S1002 follows and the alarm indication is executed by a liquid crystal display of the operation section 402 as one function of the CPU 401. An example of the alarm indication in step S1002 is shown in FIG. 11.

The operator can also continuously indicate the image forming operation by pressing a confirming button 1101 or can take a countermeasure such that the instruction is interrupted and a reparation is requested to the serviceman in accordance with the display of the operation section.

The operator can select a desired operation.

Figure 12:
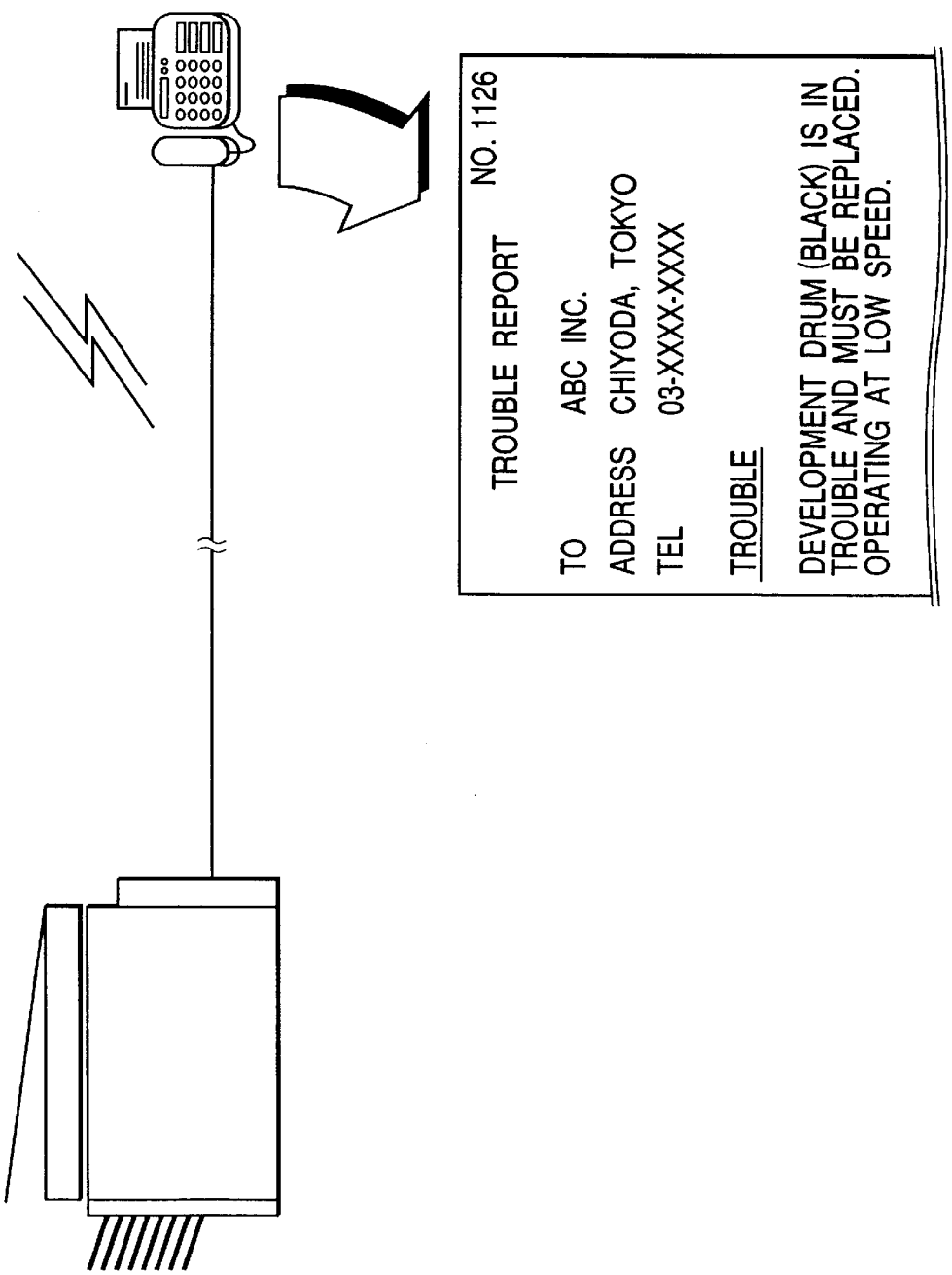
FIG. 12 is a diagram showing an alarm document transmission of another facsimile in the embodiment.

In step S1003, a check is made to see if the alarm transmission from the public telephone line has been instructed. If YES, step S1004 follows. The CPU 401 performs a mutual communication with the facsimile (alarm means) 501 connected through the external I/F 313, so that a document image representing the alarm is transmitted by the facsimile 501 to another facsimile connected to the public telephone line. An example of the alarm document transmission in step S1004 is shown in FIG. 12.

Figure 13:
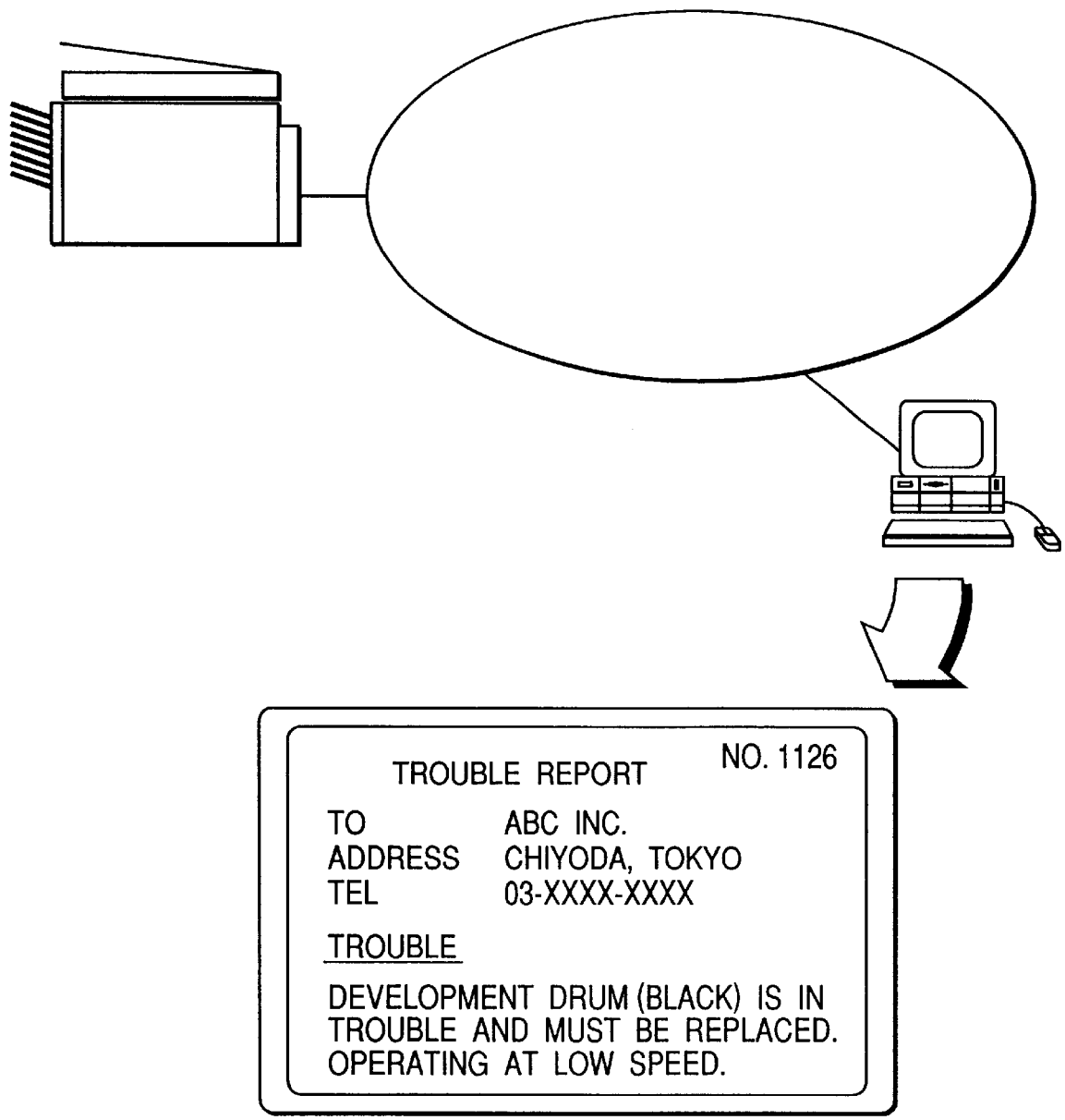
FIG. 13 is a diagram showing an alarm notification to an information terminal in the embodiment.

Subsequently, in step S1005, a check is made to see if the alarm transmission by the LAN has been instructed. If YES, step S1006 follows. The CPU 401 executes a mutual communication with the LAN I/F 502 connected through the external I/F 313, so that digital information to notify of the alarm is transmitted by the LAN I/F 502 to another information (communication) terminal (alarm means) having the LAN interface connected to the LAN. The notification of such a fact is executed. An example of the alarm execution in step S1006 is shown in FIG. 13.

Although the embodiment has been described with respect to the image forming apparatus using the ultrasonic motor as a photosensitive drum driving source, any other motor which is controlled by the speed feedback control method can be also used in place of the ultrasonic motor.

Although the invention has been described particularly with respect to the image forming apparatus, a similar mechanism can be also applied to a general control apparatus.

Although the invention has been described with regard to the image forming apparatus by the photosensitive system using a plurality of photosensitive drums, the invention can be also obviously applied to an image forming apparatus such that a photosensing operation is executed by a single photosensitive drum.

Although the invention has been described with respect to the image forming apparatus according to the transfer system using the transfer belt, the invention can be also applied to an image forming apparatus such that the image transfer is performed by the transfer drum.

According to the embodiment, the speed switching operation of the ultrasonic motor is performed by presetting the stepwise change-over patterns at 10 stages as a change-over table for use at the time of the occurrence of an ultrasonic motor drive error. However, as a table for such a purpose, it is also possible to commonly use a change-over table in the ordinary ½ speed recording mode and ¼ speed recording mode. In such a case, there is an advantage such that there is no need to particularly prepare a change-over table for use upon the occurrence of the driving error.

Although the speed of the ultrasonic motor has been switched by setting the stepwise change-over patterns at 10 stages, the number of switching stages is not necessarily set to 10. The speed can be also switched at an arbitrary number of stages of two or more stages. The switching speed can be also set to a continuous variable value under the condition such that all of the various set data, which is necessary to be changed in accordance with the speed switching operation, are converted to formulae.

The invention has been described with respect to the image forming apparatus such that the error detection and the switching of the driving speed are performed to the motor based on the speed feedback control system in which the speed can be detected at any time for the photosensitive drum and transfer belt driving system. However, a similar mechanism can be also applied to any other driving system by the motor driving in the embodiment.

An example in which the image information is transmitted from the facsimile to another facsimile through the public telephone line has been described as alarm means for notifying the operator or manager of the result of the error detection. However, the form of such information is not always necessary to be the image information. It is also possible to transmit digital information such that another digital information reception terminal connected to the public telephone line by the modem can receive the information.

According to the embodiment as mentioned above, in the case where the rotation at the target speed in the stationary state becomes disabled in the motor such as an ultrasonic motor or the like, which operates by the speed feedback loop control using the rotational speed detection signal, such a fact is directly notified to the operator or manager or the serviceman who replaces or repairs the device. On the other hand, the target speed is reduced continuously or step by step, the speed at which the stable constant speed rotation is possible is newly detected by the value of the rotational speed detection signal, the stationary rotation is performed at the different stationary rotational speed derived as a result, and the other drivers are also driven under the driving conditions according to the new stationary rotational speed. Thus, the apparatus can be tentatively driven even for a period of time until the countermeasure, such as replacement, reparation, or the like, is taken by the serviceman or the like.

What is claimed is:

1. A motor control apparatus for controlling first and second portions of a motor-driven apparatus, the first portion of the motor-driven apparatus comprising a motor and rotation means for rotating the motor, and the second portion of the motor-driven apparatus being operated, in cooperation with the rotation of the motor, to carry out a predetermined function, said motor control apparatus comprising:

rotation control means for controlling the rotational speed of the motor;

detecting means for detecting a rotation error of said motor, wherein said detecting means is connected to said rotation control means;

alarm means for warning an operator when said detecting means detects a rotation error of said motor, wherein said alarm means is connected to said detecting means, and wherein said rotation control means controls the motor so that the motor is switched to a different speed and driven in accordance with the switched speed when said detecting means detects a rotation error of the motor; and means for controlling the second portion of said motor-driven apparatus in accordance with the switched different speed when said detecting means detects a rotation error of the motor, wherein said means for controlling is connected to said detecting means and the second portion of said motor-driven apparatus.

2. An apparatus according to claim 1, wherein said rotation control means can switch the rotational speed of the motor to two or more speeds.

3. An apparatus according to claim 1, further comprising memory means for storing data relating to the controlling of the second portion of the apparatus when said rotation control means switches the rotational speed of the motor to the different speed and the motor is driven in accordance with the different speed.

4. An apparatus according to claim 1, further comprising a speed feedback control connected to said rotation control means and rotational speed detecting means for detecting the rotational speed of the motor and for generating a rotational speed detection signal representing the detected rotational speed of the motor, said rotational speed detecting means being connected to said rotation control means, wherein said rotation control means controls the rotational speed of the motor using said speed feedback control and the rotational speed detection signal.

5. An apparatus according to claim 1, further comprising rotational speed detecting means for detecting the rotational speed of the motor and for generating a rotational speed detection signal representing the detected rotational speed of the motor, said rotational speed detecting means being connected to said rotation control means, wherein said rotation control means controls the rotational speed of the motor in accordance with the rotational speed detection signal, wherein said detecting means detects the rotation error of the motor on the basis of the occurrence of a difference between a rotational speed of the motor represented by the rotational speed detection signal and a target rotational speed.

6. An apparatus according to claim 1, wherein the motor is an ultrasonic motor, and wherein said apparatus further comprises an ultrasonic vibration control for controlling the ultrasonic motor.

7. An apparatus according to claim 6, further comprising rotational speed detecting means for detecting the rotational speed of the motor and for generating a rotational speed detection signal representing the detected rotational speed of the motor, said rotational speed detecting means being connected to said rotation control means, wherein said rotation control means controls the rotational speed of the ultrasonic motor in accordance with the rotational speed detection signal, wherein the rotational speed detection signal is an encoder output signal.

8. An apparatus according to claim 6, wherein said rotation control means produces a signal and controls at least one of an ultrasonic wave pulse width and an ultrasonic wave frequency of the signal.

9. An apparatus according to claim 1, wherein said rotation control means continuously changes the rotational speed of said motor in such a direction as to be decelerated when said detecting means detects a rotation error of the motor.

10. An apparatus according to claim 9, further comprising:

memory means for storing data representing control parameters according to which the second portion of the apparatus is controlled, wherein said memory means stores data representing different values of the control parameters, depending on the rotational speed determined by said rotation control means; and means for continuously changing the control parameters with which the second portion of the apparatus are controlled when said rotation control means switches the rotational speed of the motor to a different rotational speed.

11. An apparatus according to claim 1, further comprising selecting means for enabling the operator to select whether the driving of the apparatus is interrupted or continued in response to an alarm produced by said alarm means, thereby enabling the operator to select whether or not the driving of said apparatus by speed switching is executed.

12. An apparatus according to claim 1, wherein said apparatus includes an operation panel and wherein alarm means is provided for the operation panel.

13. An apparatus according to claim 1, wherein said alarm means comprises a pubic telephone line communication terminal connected to said apparatus.

14. An apparatus according to claim 1, wherein said alarm means comprises a network communication terminal connected to said apparatus.

15. An image forming apparatus comprising:
   image forming means for forming an image comprising at least one portion and other portions;
   a motor, connected to said image forming means for driving said at least one portion of said image forming means to assist in forming the image; and
   a motor control apparatus, connected to said motor, wherein said motor control apparatus controls said motor, and wherein said motor control apparatus comprises:
      rotation control means for controlling the rotational speed of said motor;
      detecting means for detecting a rotation error of said motor, wherein said detecting means is connected to said rotation control means;
      alarm means for warning an operator when said detecting means detects a rotation error of said motor, wherein said alarm means is connected to said detecting means, and
         wherein said rotation control means controls said motor so that said motor is switched to a different speed; and
      means for controlling said other portions of said image forming means in accordance with the switched different speed when said detecting means detects a rotation error of said motor.

16. An apparatus according to claim 15, wherein said motor comprises one of a photosensitive-member driving motor and a transfer-member driving motor for rotating at least one of a photosensitive member and a transfer member.

17. An apparatus according to claim 15, wherein said rotation control means switches the rotational speed of said motor to at least two speeds.

18. An apparatus according to claim 15, further comprising memory means for storing data relating to the controlling of the other portions of the apparatus when said rotation control means switches the rotational speed of the motor to the different speed and the motor is driven in accordance with the different speed.

19. An apparatus according to claim 15, further comprising a speed feedback control connected to said rotation control means and rotational speed detecting means for detecting the rotational speed of the motor and for generating a rotational speed detection signal representing the detected rotational speed of the motor, said rotational speed detecting means being connected to said rotation control means, wherein said rotation control means controls the rotational speed of the motor using said speed feedback control and the rotational speed detection signal.

20. An apparatus according to claim 15, further comprising rotational speed detecting means for detecting the rotational speed of the motor and for generating a rotational speed detection signal representing the detected rotational speed of the motor, said rotational speed detecting means being connected to said rotation control means, wherein said rotation control means controls the rotational speed of the motor in accordance with the rotational speed detection signal, wherein said detecting means detects the rotation error of the motor on the basis of the occurrence of a difference between a rotational speed of the motor represented by the rotational speed detection signal and a target rotational speed.

21. An apparatus according to claim 15, wherein the motor is an ultrasonic motor, and wherein said apparatus further comprises an ultrasonic vibration control for controlling the ultrasonic motor.

22. An apparatus according to claim 21, further comprising rotational speed detecting means for detecting the rotational speed of the motor and for generating a rotational speed detection signal representing the detected rotational speed of the motor, said rotational speed detecting means being connected to said rotation control means, wherein said rotation control means controls the rotational speed of the ultrasonic motor in accordance with the rotational speed detection signal, wherein the rotational speed detection signal is an encoder output signal.

23. An apparatus according to claim 21, wherein said rotation control means produces a signal and controls at least one of an ultrasonic wave pulse width and an ultrasonic wave frequency of the signal.

24. An apparatus according to claim 16, wherein the transfer member, which is driven by said transfer-member driving motor, is a transfer drum.

25. An apparatus according to claim 16, wherein the photosensitive member, which is driven by said photosensitive-member driving motor, is a photosensitive drum.

26. An apparatus according to claim 18, wherein said memory means stores data relating to the controlling of optical image reading means for inputting an original image to form an image.

27. An apparatus according to claim 18, wherein said memory means stores data relating to the controlling of developing means for performing a development operation on a photosensitive member to form an image.

28. An apparatus according to claim 18, wherein said memory means stores data relating to the controlling of transfer processing means for forming an image.

29. An apparatus according to claim 18, wherein said memory means stores data relating to the controlling of fixing processing means for forming an image.

30. An apparatus according to claim 15, further comprising:
   means for operating said image forming means in a plurality of driving speed modes according to image forming conditions in a normal state so that said rotation control means controls said motor to rotate at different speeds depending on the image forming conditions; and
   means for switching the driving speed mode to a mode in which said motor can be driven during error detection by said detecting means when said detecting means detects a rotation error of said motor.

31. An apparatus according to claim 30, wherein said image forming means forms an image on one of a plurality of types of media, wherein said switching means switches the driving speed mode in accordance with the tape of media which said image forming means forms the image.

32. An apparatus according to claim 31, wherein said switching means switches the driving speed mode in response to a discrimination about whether the type of media on which said image forming means forms the image is an OHP film or a paper.

33. An apparatus according to claim 31, wherein said switching means switches the driving speed mode based on the thickness of the medium on which said image forming means forms the image.

34. An apparatus according to claim 15, wherein said rotation control means continuously changes the rotational speed of said motor in such a direction as to be decelerated when said detecting means detects a rotation error of the motor.

35. An apparatus according to claim 34, further comprising:

memory means for storing data representing control parameters according to which the other portions of the apparatus are controlled, wherein said memory means stores data representing different values of the control parameters, depending on the rotational speed determined by said rotation control means; and means for continuously changing the control parameters with which the other portions of the apparatus are controlled when said rotation control means switches the rotational speed of the motor to a different rotational speed.

36. An apparatus according to claim 15, further comprising selecting means for enabling the operator to select whether the driving of the apparatus is interrupted or continued in response to an alarm produced by said alarm means, thereby enabling the operator to select whether or not the driving of said apparatus by speed switching is executed.

37. An apparatus according to claim 15, wherein said apparatus includes an operation panel and wherein alarm means is provided for the operation panel.

38. An apparatus according to claim 15, wherein said alarm means comprises a pubic telephone line communication terminal connected to said apparatus.

39. An apparatus according to claim 15, wherein said alarm means comprises a network communication terminal connected to said apparatus.

* * * * *

UNITED STATES PATENT AND TRADEMARK OFFICE
CERTIFICATE OF CORRECTION

PATENT NO. : 6,222,301 B1
DATED : April 24, 2001
INVENTOR(S) : Akihiko Sakai

It is certified that error appears in the above-identified patent and that said Letters Patent is hereby corrected as shown below:

Column 1,
Line 54, "in" should be deleted.
Line 55, "urgent" should read -- urgently --.

Column 4,
Line 2, "by" should read -- controlled by --.

Column 6,
Line 34, "cross sectional" should read -- cross-sectional --.

Column 10,
Line 6, "a" should read -- an --.
Line 41, "of" should read -- quality of --.
Line 65, "more" should be deleted.

Column 12,
Line 44, "illuminance" should read -- the illuminance --.
Line 54, "since" should be deleted.

Column 13,
Line 48, "the and" should read -- and --.
Line 49, "illuminance" should read -- the illuminance --.
Line 50, "shading" should read -- the shading --.

Column 14,
Line 34, "to notify of" should read -- representing --.

Column 15,
Line 10, "is" should read -- are --.

UNITED STATES PATENT AND TRADEMARK OFFICE
CERTIFICATE OF CORRECTION

PATENT NO. : 6,222,301 B1
DATED : April 24, 2001
INVENTOR(S) : Akihiko Sakai

It is certified that error appears in the above-identified patent and that said Letters Patent is hereby corrected as shown below:

Column 19,
Line 6, "tape" should read -- type --.

Signed and Sealed this

Eighteenth Day of November, 2003

JAMES E. ROGAN
*Director of the United States Patent and Trademark Office*